United States Patent

Maeda et al.

[11] Patent Number: 5,813,506
[45] Date of Patent: Sep. 29, 1998

[54] DIRECT-COUPLED CLUTCH FOR TORQUE CONVERTER

[75] Inventors: Hiroaki Maeda, Toyota; Kazuo Ishikawa, Hoi-gun; Yuzo Masuda, Kariya, all of Japan

[73] Assignee: Aisin Seiki Kabushiki Kaisha, Kariya, Japan

[21] Appl. No.: 713,472

[22] Filed: Sep. 13, 1996

[30] Foreign Application Priority Data

Sep. 14, 1995 [JP] Japan .................................. 7-237216

[51] Int. Cl.$^6$ .............................. F16H 45/02; F16D 13/64
[52] U.S. Cl. ................... 192/3.29; 192/213.1; 192/213.2
[58] Field of Search .............................. 192/3.29, 213.1, 192/213.2, 213

[56] References Cited

U.S. PATENT DOCUMENTS

| 4,422,535 | 12/1983 | Ling . | |
|---|---|---|---|
| 4,735,297 | 4/1988 | Koshimo | 192/213 X |
| 4,944,374 | 7/1990 | Casse et al. | 192/3.29 |
| 4,987,981 | 1/1991 | Casse et al. | 192/3.29 |
| 5,119,911 | 6/1992 | Bochot et al. | 192/3.29 |
| 5,139,122 | 8/1992 | Maeda et al. | 192/3.29 |
| 5,246,399 | 9/1993 | Yanko et al. | 192/213.1 X |

FOREIGN PATENT DOCUMENTS

| 57-195957 | 12/1982 | Japan . |
|---|---|---|
| 3-194247 | 8/1991 | Japan . |
| 3-282043 | 12/1991 | Japan . |
| 7-44842 | 10/1995 | Japan . |

*Primary Examiner*—Rodney H. Bonck
*Attorney, Agent, or Firm*—Burns, Doane, Swecker & Mathis, LLP

[57] ABSTRACT

A direct-coupled clutch for a torque converter 10 has a front cover 11, a piston clutch plate 12 having a frictional facing 12*a*, a turbine 13, a driven plate 14, secured to the piston clutch plate 12 for rotation in unison with the piston clutch plate, a disk 16 circumferentially movably arranged between the piston clutch plate 12 and the driven plate 14, a first resilient member 17 and a second resilient member 18 arranged between the piston clutch plate 12 and the turbine 13. The driven plate 14 has a first receiving part 15*a* and a second receiving part, formed radially more inwardly than the first receiving part, for carrying the second resilient member. The driven plate 14 has a first pawl for circumferentially compressing the second resilient member and a second pawl 14*b* formed radially more inwardly than the first pawl 14*a*. The disk 16 has a retainer 16*a* for circumferentially compressing the first resilient member 17. The clutch has a simplified structure.

24 Claims, 5 Drawing Sheets

DIRECT-COUPLED CLUTCH FOR TORQUE CONVERTER

FIELD OF THE INVENTION

This invention relates to a direct-coupled clutch for a torque converter transmitting the driving force of an engine to a transmission system, in which the direct-coupled clutch interconnects an input shaft and an output shaft of the torque converter.

BACKGROUND OF THE INVENTION

As an illustrative prior-art technique for a direct-coupled clutch of a torque converter, there is a technique disclosed in JP Patent Kokai Publication JP-A-3-282043. FIG. 4 shows, in cross-section, a torque converter disclosed in this JP Patent Publication, while FIG. 5 shows a portion of a lock-up piston of FIG. 4 looking in the direction of arrow A. The known torque converter includes a front cover 1 for transmitting the driving power of an engine, a pump 8 secured to the front cover 1 for rotation in unison therewith, a turbine 9 to which a driving power is transmitted by means of an oil stream of the pump 8 and which is rotationally coupled to its output shaft, a lock-up piston 2 arranged for axial movement and selectively positioned between a coupled position in which it is rotationally coupled to the front cover 1 via a lining 22 and a release position in which it is disengaged from the front cover 1, a pawl 21 formed on the lock-up piston 2, a first member 3 rotationally coupled to the lock-up piston 2 via an end wall of a recess 31 engaged by the pawl 21, a second member 4 rotatably arranged relative to the first member 3 and rotationally coupled to the lock-up piston 2, and resilient members 5, 61, 62 for resiliently coupling the first member 3 and the second member 4 to each other. The second member 4 has protrusions 4e and 4f disposed engageable with the pawl 21 of the piston 2 with a play corresponding to a pre-set angle of rotation between the first member 3 and the second member 4.

Based on this technique, since the second member 4 has the protrusions 4e and 4f that may be abutted against the pawl 21 of the lockup piston 2, and hence a stop mechanism is separated from a window 4a holding the resilient members 61, 62, there is no risk of the window 4a holding the resilient members 61, 62 becoming deformed even on an occasion of transmission of a rotational torque exceeding a pre-set value.

SUMMARY OF THE DISCLOSURE

However, according to eager investigation of the present inventors, there has been found certain problem in art. With the direct-coupled clutch of the above-described conventional torque converter, since the pawl 21 of the lock-up piston 2 and the recess 31 of the first member 3 are complex in shape, the cost for machining tends to be increased. In addition, since the second member 4 for holding the resilient members 5, 61, 62 is comprised of two plates 41, 42, the number of component parts making up the direct-coupled clutch mechanism is increased, thus possibly increasing the number of assembling steps.

Also, there is much to be desired as for the dynamic stability of the direct-coupled clutch in the art.

It is therefore an object of the present invention to provide a direct-coupled clutch mechanism of a torque converter which is simplified in structure to a maximum extent possible.

It is another object of the present invention to provide a direct-coupled clutch mechanism having a dynamic stability.

Further objects will become apparent from the entire disclosure.

For solving the above problem, a first aspect of the present invention provides a direct-coupled clutch for a torque converter. The torque converter comprises: a front cover connected to an input of a torque converter, a piston clutch plate having a frictional facing that may be caused to bear against an inner surface of the front cover, a turbine connected to an output side of the torque converter, a driven plate connected to the turbine and secured to the piston clutch plate for rotation in unison therewith, a disk circumferentially movably arranged between the piston clutch plate and the driven plate, a first resilient member for absorbing torque variation between the piston clutch plate and the disk, and a second resilient ember for absorbing torque variation between the disk and the turbine. The driven plate has a first receiving part for receiving the first resilient member and a second receiving part formed radially more inwardly than the first receiving part for receiving the second resilient member. The driven plate has a first pawl for circumferentially compressing the second resilient member and a second pawl formed radially more inwardly than the first pawl. The disk has a retaining portion for circumferentially compressing the first resilient member.

With the subject-matter of a first aspect, the first resilient member and the second resilient member may be arranged in tandem by a simplified structure comprised of the first pawl formed on the driven plate and the retaining portion formed on the disk, so that a broad torsional angle may be produced for assuring facilitated absorption of torque variations during the on-period of the direct-coupled clutch. Accordingly, the dynamic stability is secured.

According to a second aspect, in addition to the subject matter of the first aspect, the second pawl of the driven plate is disposed in a cut-out formed in the disk to rotatably support the disk.

Thus, by the simplified structure comprised of the second pawl provided on the driven plate and the cut-out formed in the disk, it becomes possible to form a disk guide portion and a stopper for limiting rotation of the second resilient member.

According to a third aspect, additive to the subject matter of claim 1, the second pawl of the driven plate is adapted for being in sliding contact with an inner rim end of the disk.

According to the third aspect, since the second pawl is arranged on the inner rim end than the second resilient member with respect to the disk guide by the second pawl of the driven plate, and hence the guide portion is subjected to circumferential sliding movement smaller than that in the case where the guide portion is arranged on the outer rim end, this guide portion is susceptible to wear to a lesser extent.

According to a fourth aspect, according to one of the first to third aspects, the piston clutch plate and the driven plate are interconnected by rivets with a disk interposed therebetween allowing the disk circumferential relative movement, and the first resilient member and the second resilient member are circumferentially guided by the disk and the driven plate therebetween.

Since the first resilient member and the second resilient member are guided by the disk and the driven plate, number of the plate members of the driven plate for guiding the resilient members may be diminished.

According to a fifth aspect, there is provided with supporting and guiding means for radially supporting and circumferentially guiding the disk at an inner central part of the disk. This structure assures stable arrangement of the disk under a high speed rotation. Namely it provides dynamic stability during rotation since the disk is guided and supported at the innermost part thereof.

According to a sixth aspect, there is provided a direct-coupled clutch comprising a piston clutch plate, a driven plate connected to a turbine and secured to the piston clutch plate for rotation in unison therewith, a disk transmitting torque between the piston clutch plate and the driven plate and circumferentially movably disposed between the piston clutch plate and the driven plate, a first torque damping means for absorbing torque variation between the piston clutch plate and the disk, a second torque damping means for absorbing torque variation between the disk and the turbine, wherein the second torque damping means is disposed radially more inwardly than the first torque damping means, the disk transmits the torque via the first and second damping means, and the disk is circumferentially slidably disposed by means of a rivet connecting the piston clutch plate and the driven disk. The torque damping means comprises a pawl formed on one of the disk and the driven plate, and a resilient member retailed by the pawl and disposed within a corresponding window receiving the resilient member. The window may be formed either one (or both) of the disk and the driven plate. The disk may be radially and circumferentially rotatably supported by a pawl formed at the inner (central) part of the driven plate, which pawl may act as a stopper for the relative rotation.

Effect of the Invention may be summarized below, however, unlimited thereto.

With the subject-matter of the first aspect, the first resilient member and the second resilient member may be arrayed in tandem by a simplified structure comprised of the first pawl formed on the driven plate and the retaining portion formed on the disk, thereby enabling the torsional angle of the direct-coupled clutch to be increased for facilitating absorption of the shock at the time of turning on of the direct-coupled clutch during low-speed operation. This enables the direct-coupled clutch to be turned on during low-speed operation thus improving fuel cost. Also the dynamic stability is secured.

With the subject-matter of the second aspect, the stopper of the second resilient member may be formed by a simplified construction comprised of the second pawl of the driven plate and the cut-out of the disk. In addition, machining may be facilitated and the machining cost may be diminished.

With the subject-matter of the third aspect, in guiding the disk by the second pawl of the driving plate, the guide portion performs only a small circumferential sliding movement, so that this guide position is not liable to wear.

With the subject-matter of the fourth aspect, since the driven plate is secured to the piston clutch plate, and the disk is provided with the function of guiding the first and second resilient members, the first and second resilient members are guided by the disc and the driven plate serving as a guide cover, respectively so that an additional guide cover member for guiding the resilient members can be eliminated.

Advantages of further aspects of the invention will become apparent in the entire disclosure.

DESCRIPTION OF THE PREFERRED EMBODIMENTS

Figure 1:
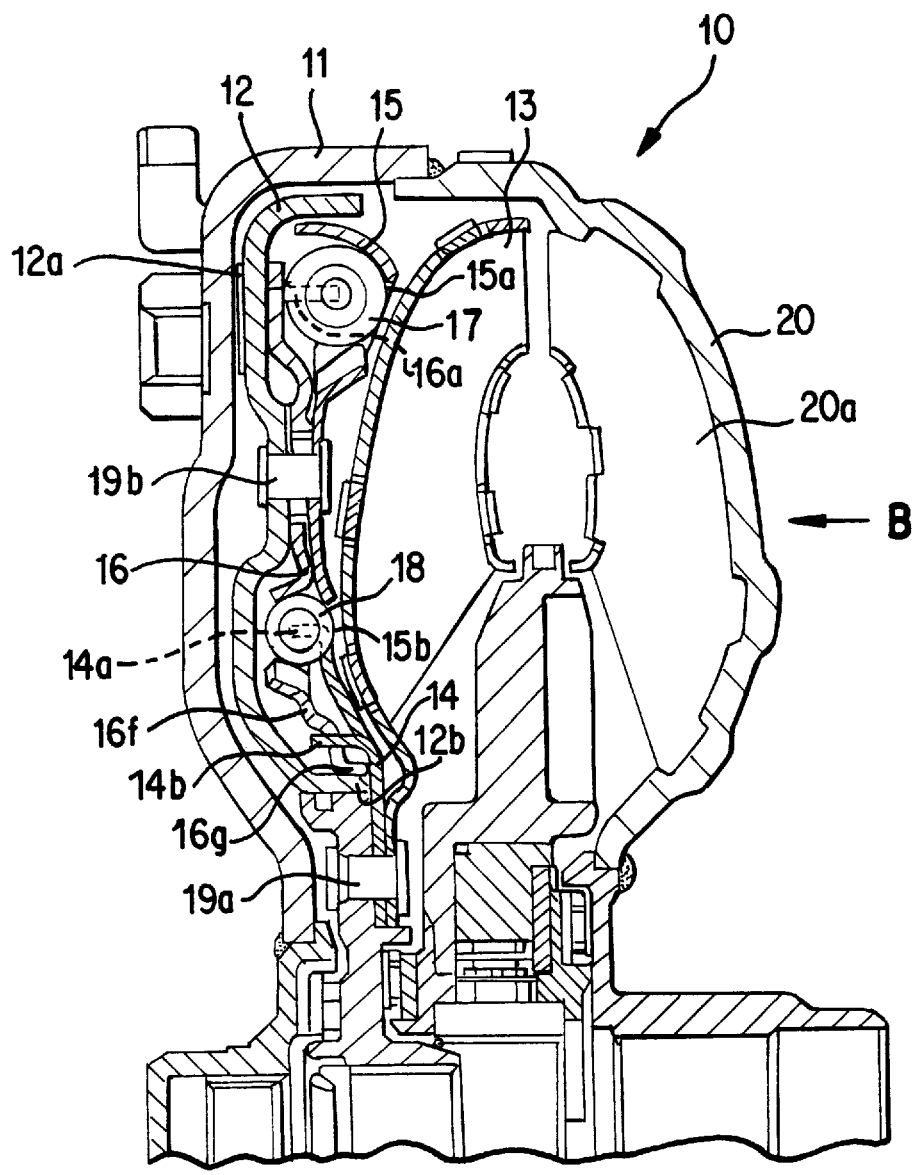
FIG. 1 is a cross-sectional view showing a torque converter according to an embodiment of the present invention.

Referring to the drawings, preferred embodiments of the present invention will be explained in detail.

Figure 2:
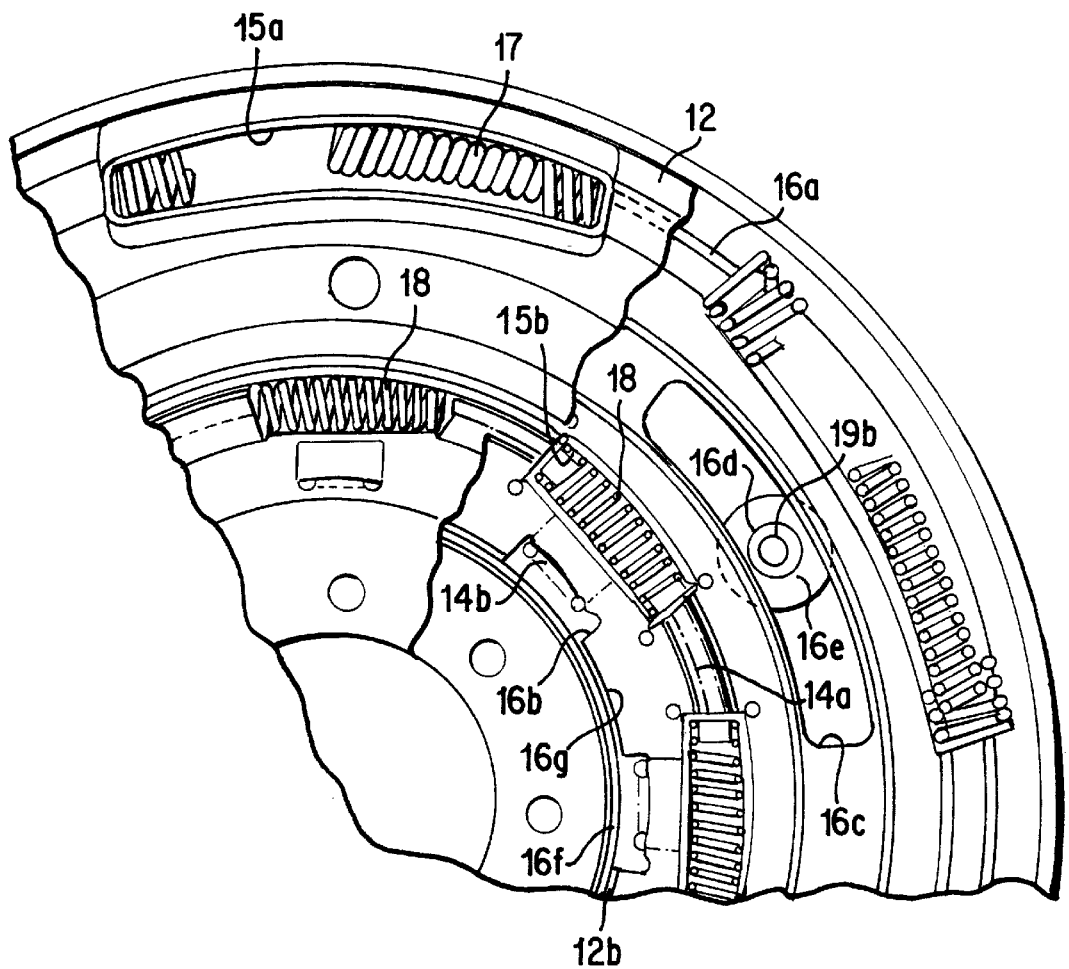
FIG. 2 is a plan view looking in the direction of arrow B in FIG. 1.

FIG. 1 shows, in cross-section, a torque converter 10 according to an embodiment of the present invention, and FIG. 2 is a partial view of a piston clutch plate 12 of FIG. 1 looking along arrow B. A direct-coupled clutch of the torque converter 10 includes a front cover 11 coupled to an input shaft, and a piston clutch plate 12 having a friction facing 12a that may be caused to bear against the inner surface of the front cover 11. The direct-coupled clutch also includes a turbine 13 coupled to an output shaft, and a driven plate 14 connected to the turbine 13 by rivets 19a. Also the guide cover portion 15 is secured by rivets 19b to the piston clutch plate 12 for rotation in unison therewith. The direct-coupled clutch further comprises a disk 16 interposed between the piston clutch plate 12 and the driven plate 14 for relative movement circumferentially by an opening 16c. The direct-coupled clutch additionally includes a first spring 17 constituting a first resilient member absorbing the torque variation between the piston clutch plate 12 and the disc 16, and a second spring 18 constituting a second resilient member absorbing the torque variation between the disk 16 and the turbine 13. The guide cover portion 15 of the driven plate includes a window (first receiving part) 15a, operating as a first receiving part housing the first spring 17 therein, and a jaw 15b and a window formed radially more inwardly than the window 15a and operating as a second receiving part for housing the second spring 18 therein. The driven plate 14 includes a first pawl 14a capable of circumferentially compressing the second spring 18 and a second pawl 14b formed more radially inwardly than the first pawl 14a and operating for rotatably supporting the disk 16. The disk 16 has a retaining portion 16a axially protruded toward the first spring from the disk for circumferentially compressing the first spring 17. The guide cover portion 15 and the disk 16 are configured for circumferentially holding the first spring 17 and the second spring 18, respectively.

The disk 16 comprises a small sliding surface at its small bent portion 16f which is slidably guided by the second pawl 14b of the driven plate 14. The innermost end of the disk 16 is formed as a bent end 16g which is guided by an inner surface of an inner bent end wall 12b of the piston clutch plate 12.

The disk 16 is guided at its inner rim, so that the guide performs only a small sliding movement on relative rotation between the piston clutch plate 12 and the disk 16 and hence the guide unit is less liable to wear. With the direct-coupled clutch mechanism of the present embodiment, since the first spring 17 and the second spring 18 are arranged in tandem, an increased torsional angle between the piston clutch plate 12 and the disk 16 may be achieved. Since the maximum torsional angle can be increased in the present embodiment to about twice that with the prior art, that is to 26°, torque fluctuations during low operating speed, with the direct-coupled clutch being turned on, can be absorbed more easily.

Moreover, with the direct-coupled clutch of the present embodiment, a plate (washer) 16e wider in width than the opening 16c is clamped between the piston clutch plate 12 and the spacer 16d arranged in the opening 16c of the disc 16 by a mounting portion by the rivet 19a of the guide plate 15 and the piston clutch plate 12 for preventing the outer rim portion of the disc 16 from being tilted towards the piston clutch plate 12. This structure prohibits wear of the disk 16 due to contact thereof with the piston clutch plate 12. This eliminates the necessity of quenching and tempering the piston clutch plate 12. The guide (sliding portion) of the inner rim end of the disk 16 is formed as a bent end 16g and a small bent portion 16f, both being slightly bent in an axial direction, therefore sufficient sliding area can be secured even with a thin disk 16.

The operation of the present embodiment is now explained.

When the direct-coupled clutch is turned off, the front cover 1 is run in rotation under the driving force of the engine for rotating a pump shell via the front cover 11. On the inner peripheral surface of the pump shell are mounted plural pump blades 20a. By rotation of the pump blades 20a, the turbine 13 connected to the output shaft is rotated via the fluid in the torque converter 10 thereby transmitting the rotary driving force to the output shaft. When the direct-coupled clutch is turned off, the frictional facing 12a is not caused to bear against the front cover 11, with the piston clutch plate 12, disk 16 and the driven plate 14 being rotated in unison with the turbine 13. However, since the rotary driving force of the input shaft is transmitted to the output shaft only under the force of the fluid, rotational slip (resulting in fuel loss) due to fluid slip is produced between the input and output shafts.

The direct-coupled clutch is turned on responsive to the vehicle speed or throttle opening degree for directly coupling the driving rotational force of the engine transmitted to the front cover 11 of the torque converter 10 to the output shaft without the intermediary of the fluid, the fluid loss caused by fluid slip as described above may be diminished. The operation with the direct-coupled clutch being turned on it now explained.

When, under the pressure of oil flowing in from the turbine 13 and oil discharge on the side of the frictional facing 12a, the piston clutch plate 12 is moved towards the inner rim of the front cover 11 and brought into abutment with the front cover 11 under a differential pressure applied to the clutch plate 12, the rotational input from the engine is transmitted from the front cover 11 to the piston clutch 12 via the frictional facing 12a to establish an operating state of the direct-coupled clutch.

Conversely, when oil is supplied from the frictional facing 12a and discharged on the side of the turbine 13, a differential pressure opposite in direction to the case where the direct-coupled clutch is on is produced on the piston clutch plate 12. Thus the frictional facing 12a is disengaged from the front cover 11, with the piston clutch plate 12 being moved towards the turbine 13 to establish a turned-off state of the direct-coupled clutch.

The operation of various component parts with the direct-coupled clutch being turned on is now explained in detail.

With the direct-coupled clutch being on, the piston clutch plate 12, disk 16, driven plate 14 and the springs are moved axially in unison towards the inner rim of the front cover 11 until the frictional facing 12a is caused to bear (be pressed) against the inner surface of the front cover 11. The piston clutch plate 12 is rotated in unison with the front cover 11, via the frictional facing 12a, such that ultimately the turbine 13 is also rotated in unison with the front cover 11. This allows the driving force of the engine to be transmitted directly to the turbine 13 via the piston clutch plate 12. Specifically, the rotational driving force (torque) from the engine is transmitted to the front cover 11 and further transmitted via the frictional facing 12a to the piston clutch plate 12 and to the driven plate 14 transmits the torque via the first spring 17 to the retaining portion (retaining pawl) 16a of the disk 16, at the same time the disc 16 transmits a torque to the second spring 18 in an amount equal to that transmitted to the first spring 17. This produces a relative rotational offset (relative rotation) corresponding to a flexure caused to the first spring 17 between the disk 16 and a group of the piston clutch plate 12 and the driven plate 14. Simultaneously, a relative rotational offset is produced in an amount of a flexure caused to the second spring 18 between the disk 16 and the driven plate 14, thus transmitting the torque to the first pawl 14a of the driven plate 14. If the input torque is increased, the flexure of the second spring 18 is increased to increase the relative rotational offset between the disk 16 and the driven plate 14. Finally, the second pawl 14b of the driven plate 14 is caused to bear against the cut-out 16b of the disc 16, the relative rotational offset between the driven plate 14 and the disk 16 then ceasing to be increased. If the input torque is increased further, only the first spring 17 is flexed (compressed), thus further increasing the relative rotational offset between the disk 16 on one hand and the piston clutch 12 and the driven plate 14 on the other hand, with the input torque and the relative rotational offset being increased until the spacer 16d is caused to abut against an end wall of the opening 16c of the disk 16.

When the spacer 16d is caused to abut against the end wall of the opening 16c, the piston clutch plate 12 and the disk 16 are rotated in unison. That is, the input side and the output side are coupled together and rotated in unison.

The above description has been made for the forward relative rotation between the input and output shafts. The operation for a case in which the rotation of the output shaft is larger than that of the input shaft, i.e., under a reverse relative rotation such as when the car is running downhill under engine brake, is the same as that described above except the direction of compression of the first spring 17 and the second spring 18 and the rotational direction of the disc 16.

In the present embodiment, since the springs 17 and 18 are arranged in tandem on the inner and outer rim portions and the spring load of the first spring 17 is applied to the retaining portion 16a of the disk 16, sufficient values of torsional torque and torsional angles may be obtained with the direct-coupled clutch being turned on. By arranging the stopper of the second spring 18 on the more inner rim side than the second spring 18 by means of the cut-out 16b of the disk 16 associated with the second pawl 14b of the driven plate and by constituting the guide for the disk 16 by the outer rim portion of the first pawl 14a of the driven plate 14 or the piston clutch plate 12, the machining cost may be diminished without complicating the shape. In addition, by securing the driven plate 14 to the piston clutch plate 12 by the rivets 19 and by providing the disk 16 with the function of guiding the first spring 17 and the second spring 18, it is only necessary to provide only one plate member for the driven plate 14.

Figure 4:
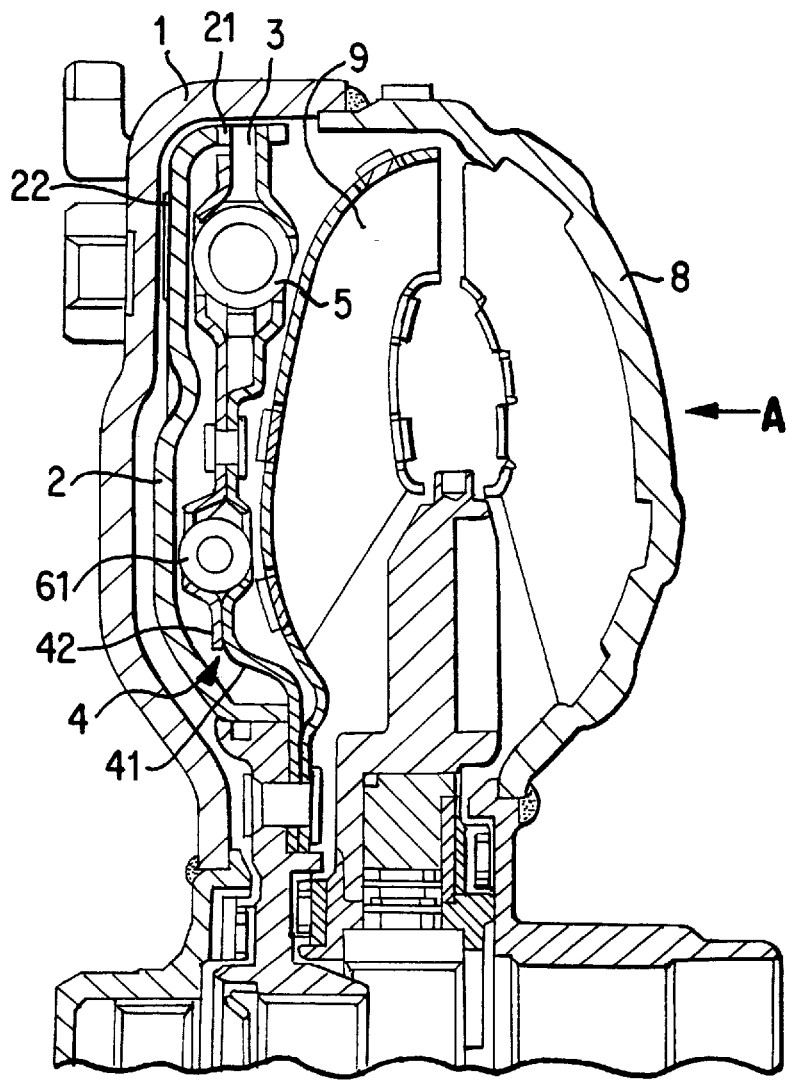
FIG. 4 is a cross-sectional view showing a direct-coupled clutch of a conventional torque converter.
Figure 5:
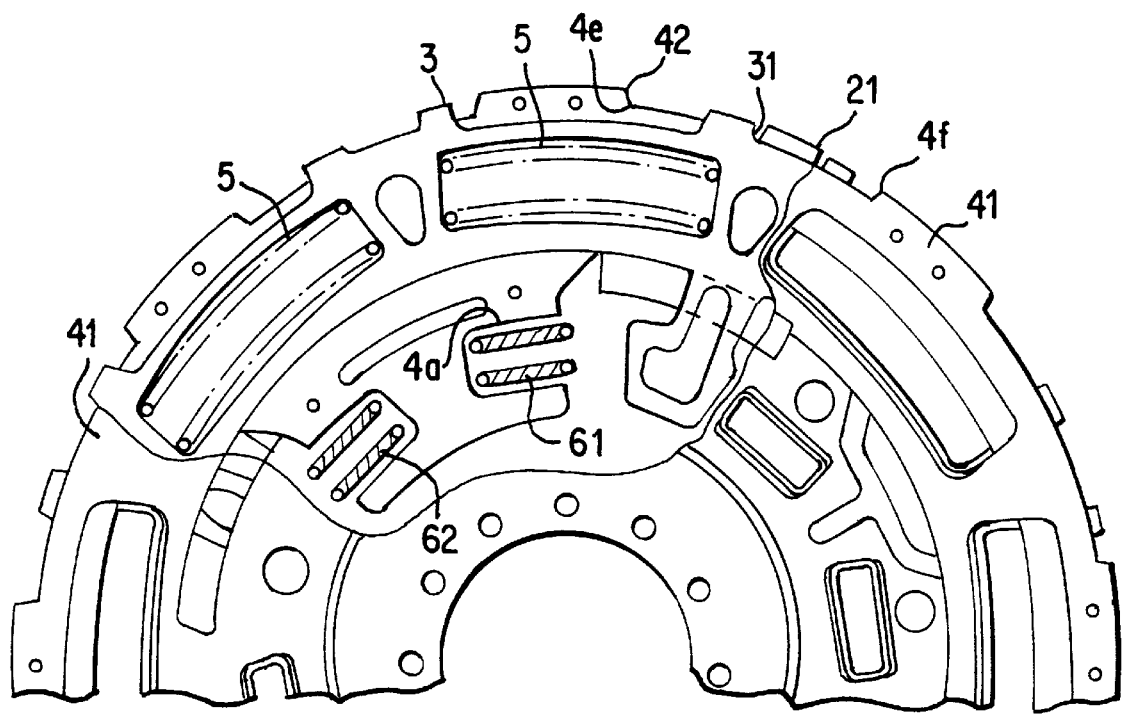
FIG. 5 is a plan view looking in the direction of arrow A in FIG. 4.

On the other hand, first and second springs are guided by two plates 41 and 42 forming a driving plate according to the conventional direct-coupled clutch as shown in FIG. 4. In contrast, the present invention provides a driven plate formed of a single plate resulting in a simplified structure of the direct-coupled clutch as a whole. It is further noted that, whereas the conventional direct-coupled clutch of FIG. 4 has the first member 3 formed of a thick plate member, the present invention uses only a disk 16, in place of the first member 3, the disk being press-formable or stamp-formable from a thin plate. Thus the present invention achieves reduction of the number of component parts and weight without adversely affecting the durability of the apparatus.

It is further noted that the disk 16 which is a member allowed to rotate relatively of the driven plate 14 fixed to the turbine and the piston clutch plate 12 is steadily retained by the sliding contact at the inner area, i.e., the second pawl and/or inner rim end of the disk. This offers significant advantage in the dynamic stability as compared with the prior art in which the first member 3 which is disposed at the outer periphery of the clutch without securing radial contact with securing members 41,42.

The direct-coupled clutch of the torque converter according to the present invention is simpler in structure than the conventional clutch. Moreover, a direct-couple clutch which gives a larger torsional angle may be provided thus enabling the machining cost to be reduced further.

Figure 3:
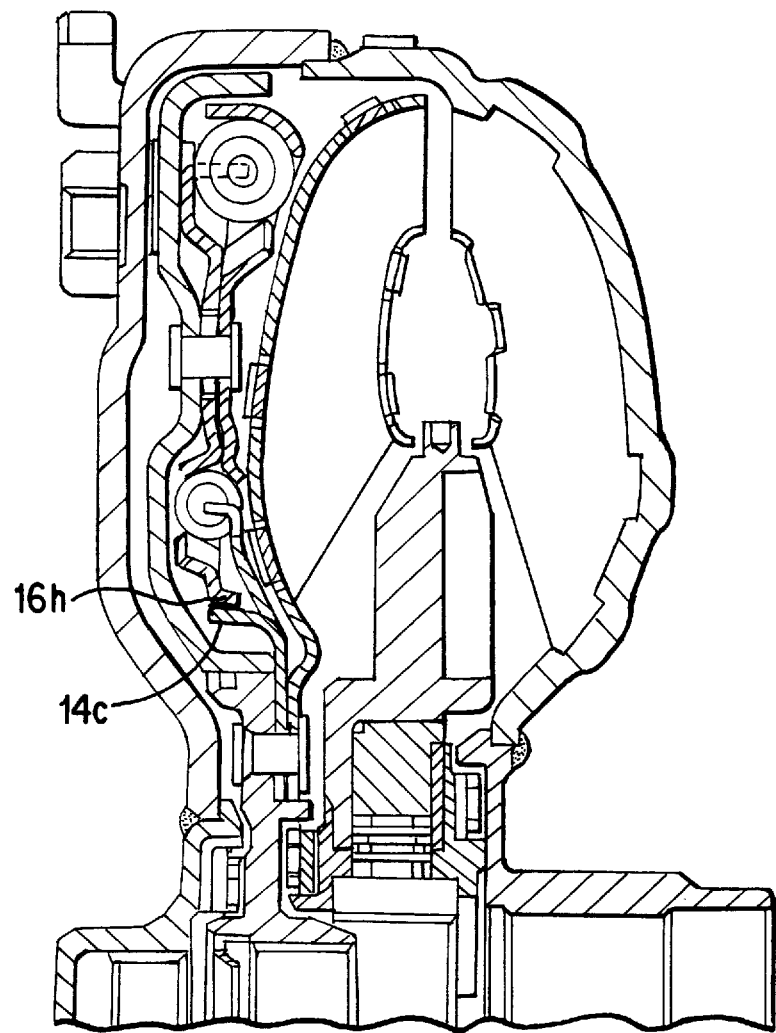
FIG. 3 is a cross-sectional view showing a torque converter according to another embodiment of the present invention.

FIG. 3 shows another embodiment of the present invention. The difference from the embodiment of FIG. 1 resides in the difference as to the position of the second pawl 14c of the driven plate 14, that is, the fact that the second pawl 14c is positioned so as to be in sliding contact with the inner bent rim end 16h of the disk 16. This arrangement diminishes vibrations in the mounting position of the disc 16 in the radial direction, while reducing the amount of the circumferential sliding movement of the of the guide portion of the disk 16 and hence the amount of wear to the disk guide portion. The structure of the portions other than the inner bent rim end 16h and the second pawl 14c is the same as that of the embodiment of FIGS. 1 and 2 and hence the description is omitted.

As many apparently widely different embodiments of the present invention can be made without departing from the spirit and scope thereof, it is to be understood that the invention is not limited to the specific embodiments thereof except as defined in the appended claims.

What is claimed is:

1. A torque converter comprising:
   a front cover for being connected to an input shaft; a piston clutch plate having a frictional facing adapted to bear against an inner surface of said front cover; a turbine for being connected to an output shaft;
   a driven plate connected to said turbine and secured to said piston clutch plate for rotation in unison therewith;
   a disk circumferentially movably arranged between said piston clutch plate and said driven plate;
   a first resilient member for absorbing torque variation between said piston clutch plate and said disk;
   and a second resilient member for absorbing torque variation between said disk and said turbine;
   wherein said driven plate has a first receiving part for receiving said first resilient member and a second receiving part formed radially more inwardly than said first receiving part for receiving said second resilient member;
   said driven plate has a first pawl for circumferentially compressing said second resilient member and a second pawl formed radically more inwardly than said first pawl; and
   said disk has a retaining portion for circumferentially compressing said first resilient member.

2. The torque converter as defined in claim 1 wherein said second pawl of said driven plate is disposed within a cut-out formed in said disk to rotatably carry said disk.

3. The torque converter as defined in claim 2 wherein said second awl is slidably disposed within said cut-out of the disk so as to allow a preset amount of relative rotation between the disk and the driven plate.

4. The torque converter as defined in claim 1 wherein said second pawl of said driven plate is adapted to slidably contact with an inner rim end of said disk.

5. The torque converter as defined in claim 4, wherein said inner rim end of the disk has a small bent portion for slidable contact with the second pawl.

6. The torque converter as defined in claim 1 wherein said piston clutch plate and said driven plate are interconnected by rivets interposing a disk therebetween for circumferential relative movement, and wherein said first resilient member and the second resilient member are circumferentially guided by said disk and the driven plate.

7. The torque converter as defined in claim 6 wherein said first disk has a window receiving the second resilient member.

8. The torque converter as defined in claim 7 wherein the first receiving part for receiving the first resilient member comprises a window receiving the first resilient member.

9. The torque converter as defined in claim 6 wherein a plurality of the second resilient members are each circumferentially disposed between neighboring pairs of a plurality of first pawls.

10. The torque converter as defined in claim 6 wherein each of said rivets is disposed within an opening of the disk for allowing circumferential relative movement between the disk and the driven plate.

11. The torque converter as defined in claim 1 wherein said disk has an inner rim end which slidably contacts an inner wall of the piston clutch plate.

12. The torque converter as defined in claim 1 wherein said retaining portion of the disk is a bent rib of the disk protruding toward the driven plate.

13. The torque converter as defined in claim 12 wherein the first resilient member is secured between a neighboring pair of retaining portions within the first receiving part formed as a window of the driven disk.

14. The torque converter as defined in claim 1 wherein the first and second pawls are both formed as bent pawls of the driven plate both protruding toward the disk.

15. The torque converter as defined in claim 1 wherein said disk and driven plate are formed of press-formed plate members.

16. The torque converter comprising:
   a front cover for being connected to an input shaft; a piston clutch plate having a frictional facing adapted to bear against an inner surface of said front cover; a turbine for being connected to an output shaft;
   a driven plate connected to said turbine and secured to said piston clutch plate for rotation in unison therewith;
   a disk circumferentially movably arranged between said piston clutch plate and said driven plate;
   a first resilient member for absorbing torque variation between said piston clutch plate and said disk;
   and a second resilient member for absorbing torque variation between said disk and said turbine;
   wherein said driven plate has a first receiving part for receiving said first resilient member and a second receiving part formed radially more inwardly than said first receiving part for receiving said second resilient member;

said disk has a retaining portion for circumferentially compressing said first resilient member;

said driven plate has a first pawl for circumferentially compressing said second resilient member; and supporting and guiding means for radially supporting and circumferentially guiding said disk at an inner central part of the disk.

17. The torque converter as defined in claim 16 wherein said driven plate has a second pawl formed radially more inwardly than said first pawl, said second pawl being disposed within a cut-out formed in said disk to rotatably carry said disk.

18. The torque converter as defined in claim 17 wherein said second pawl of said driven plate is caused to slidably contact with an inner rim end of said disk.

19. The torque converter as defined in claim 18 wherein said piston clutch plate and said driven plate are interconnected by rivets interposing a disk therebetween for circumferential relative movement, and wherein said first resilient member and the second resilient member are circumferentially guided by said disk and the driven plate.

20. The torque converter as defined in claim 19 wherein said second pawl defines a first relative rotational angle and said rivets define a second relative rotational angle greater than the first relative rotational angle, between the driven plate and the disk.

21. A direct-coupled clutch for torque converter comprising:

a piston clutch plate, a driven plate connected to a turbine and secured to the piston clutch plate for rotation in unison therewith, a disk transmitting torque between the piston clutch plate and the driven plate and circumferentially movably disposed between the piston clutch plate and the driven plate, a first torque damping means for absorbing torque variation between the piston clutch plate and the disk, a second torque damping means for absorbing torque variation between the disk and the turbine, wherein the second torque damping means is disposed radially more inwardly than the first torque damping means, the disk transmits the torque via the first and second damping means, and the disk is circumferentially slidably disposed by means of a rivet connecting the piston clutch plate and the driven disk.

22. The direct-coupled clutch as defined in claim 21 wherein said torque damping means comprises a pawl formed on one of the disk and the driven plate, and a resilient member retained by the pawl and disposed within a corresponding window receiving the resilient member.

23. The direct-coupled clutch as defined in claim 22 wherein said window is formed in either one or both of the disk and the driven plate.

24. The direct-coupled clutch as defined in claim 23 wherein the disk is radially and circumferentially rotatably supported by a pawl formed at the inner central part of the driven plate, said pawl acting as a stopper for relative rotation between the disk and the driven plate.

* * * * *